United States Patent  [15] 3,675,497
Thomas  [45] July 11, 1972

[54] SLIDING SHAFT POWER TAKE OFF SPEED CHANGE

[72] Inventor: Alfred William Thomas, Earl Shilton, England

[73] Assignee: Massey-Ferguson Services N.V., Curacao, Netherlands Antilles

[22] Filed: Jan. 15, 1971

[21] Appl. No.: 106,823

[30] Foreign Application Priority Data

Jan. 24, 1970    Great Britain.....................3,557/70

[52] U.S. Cl..............................74/15.4, 74/11, 192/48.9, 192/67 R, 287/119 R, 287/53 SS
[51] Int. Cl...................F16h 37/00, F16d 11/04, F16d 1/06
[58] Field of Search.............74/11, 15.4, 15.6, 15.69, 356, 74/362, 363; 287/53 SS, 119 R; 192/70.2, 67 R, 48.9, 48.91

[56] References Cited

UNITED STATES PATENTS

| | | | |
|---|---|---|---|
| 1,181,079 | 4/1916 | Kelso | 74/391 X |
| 2,474,789 | 6/1949 | Perhacs | 192/48.9 |
| 3,252,721 | 5/1966 | Weasler | 74/11 UX |
| 3,260,541 | 7/1966 | Sadler et al. | 74/11 X |
| 3,279,275 | 10/1966 | Christie | 74/15.4 X |

Primary Examiner—Leonard H. Gerin
Attorney—Gerhardt, Greenlee & Farris

[57] ABSTRACT

Apparatus is provided for the purpose of driving a power-take-off shaft at one of two speeds the change of speed being effected by moving the shaft and its bearing housing longitudinally of the shaft so that a gear on the shaft meshes with one or other of two drive gears, the arrangement being that the housing is retained in one or other of the two positions by a spring urged ball locking device which can be easily unlocked to permit such movement.

11 Claims, 3 Drawing Figures

INVENTOR
ALFRED W. THOMAS

3,675,497

SLIDING SHAFT POWER TAKE OFF SPEED CHANGE

This invention relates to power-take-off shafts (hereinafter referred to as p.t.o. shafts) for agricultural and industrial tractors, and other vehicles.

It has heretofore been proposed to provide p.t.o. shafts which can be driven at two different speeds to suit different implements or attachments, one speed being relatively low and of the order of 540 r.p.m. and the other speed being relatively high and of the order of 1,000 r.p.m.

In one prior proposal, the p.t.o. shaft is axially shiftable between two positions in one of which it engages exclusively with a gear driven at one speed, and in the other of which it engages exclusively with a gear driven at another speed. The shaft is journalled in the vehicle frame or body and is resiliently biased in the rearward direction where it is splined in a sleeve to which can be fitted two different adapters which determine the axial position of the shaft and hence the speed at which it is to be driven. When it is desired to change from one p.t.o. shaft speed to the other, it is necessary to remove one adapter and replace it by the other. This has meant, on the occasion of each change in adapters, the coupling or uncoupling of an adapter against the resilient bias of the shaft.

In another prior proposal, the p.t.o. shaft is splined in a driving sleeve and can be reversed end-for-end in the sleeve to effect the speed change. The shaft is longer at one end than at the other, with reference to the spline location, and the longer end, when moved into the speed-transmitting position, engages a clutch element disposed between the sleeve and the driving gears to shift the clutch element out of engagement with a gear rotatable at the relatively low speed and into engagement with a gear rotatable at the relatively low speed and into engagement with a gear rotatable at the relatively high speed, the shift being against resilient means urging the clutch element to the lower speed position.

An object of the present invention is to provide a two-speed p.t.o. shaft mounting which obviates the need for p.t.o. shaft adapters or reversal of the p.t.o. shaft to effect the change of speed.

According to the present invention there is provided a two-speed p.t.o. shaft which is splined for driving engagement with either one of two driven gears concentric with and spaced axially of the shaft, the length of the splining being such in relation to the axial spacing of said driven gears that the splines are out of engagement with both gears in an intermediate position when the shaft is moved axially from a position wherein the splines engage either of the gears to a position wherein the splines engage the other gear, and the shaft being locked in each of said engaged positions against axial displacement relative to a fixed part by an annular series of circumferentially spaced balls between two relatively axially moveable components one of which has alternative grooves for the balls, the balls being held in engagement in either groove by a locking member which is resiliently loaded in the direction of ball captivation and is displaceable against the resilient loading to release the balls and enable relative axial movement of the components to bring the other groove to the position in which it locates the balls.

Preferably, said two relatively axially moveable components are a bearing housing concentric with and axially fast with the shaft, and a tubular casing co-axial with and closely surrounding said bearing housing, the latter mounting said annular series of circumferentially spaced balls and said tubular casing including in its inner peripheral surface said alternative grooves for the balls.

Other objects and advantages of the invention will be readily apparent from the accompanying drawings and description and the essential features will be set forth in the appended claims. In the drawings:

Figure 1:
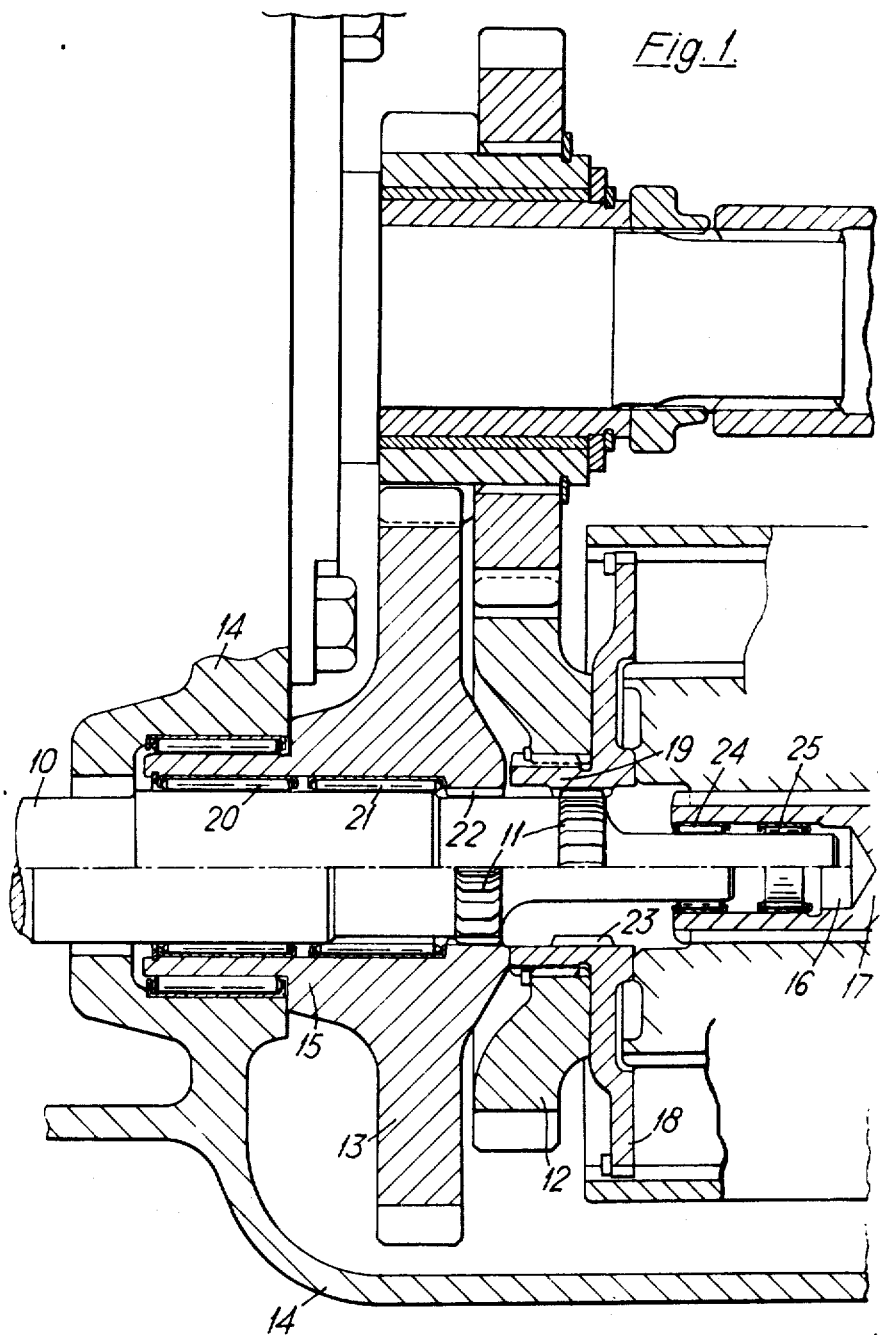
FIG. 1 is a longitudinal sectional view of part of the drive of a p.t.o. shaft according to the present invention and showing the members in two different positions on opposite sides of the axis of the p.t.o. shaft.

Referring firstly to FIG. 1, the p.t.o. shaft is denoted 10 and has formed thereon an annular set of teeth or splines 11 which can engage with either one of two driven gears 12 and 13 concentric with the shaft. In the upper part of FIG. 1 the set of teeth 11 is engaged with the relatively high-speed gear 12 and in the lower part of FIG. 1 is engaged with the relatively low-speed gear 13.

The gears 12 and 13 are part of a gear set within a housing 14 and used for transmitting drive between the prime mover (not shown) of the tractor and driving shafts such as the p.t.o. shaft 10. The latter extends into the housing, through the hub 15 of gear 13, and into a socket 16 in the rear end of a shaft 17 extending in a forward direction with reference to the tractor. The shaft 17 is in constant-drive relationship with the relatively high-speed gear 12 through a clutch member 18 having a hub 19 on which the gear 12 is splined and locked and through which the p.t.o. shaft 10 freely extends in its relatively low-speed position.

The hub 15 is supported from the p.t.o. shaft 10 by means of roller bearings 20 and 21 and has splines 22 adapted to be engaged by the set of teeth 11 in the relatively low-speed position of the p.t.o. shaft, and the hub 19 has splines 23 adapted to be engaged by the set of teeth 11 in the relatively high-speed position of the p.t.o. shaft. Roller bearings 24 and 25 are provided in the socket 16 to receive the end of the p.t.o. shaft 10, the bearing 24 being operative at all times and the bearing 25 being operative only in the relatively high-speed position of the p.t.o. shaft.

Figure 2:
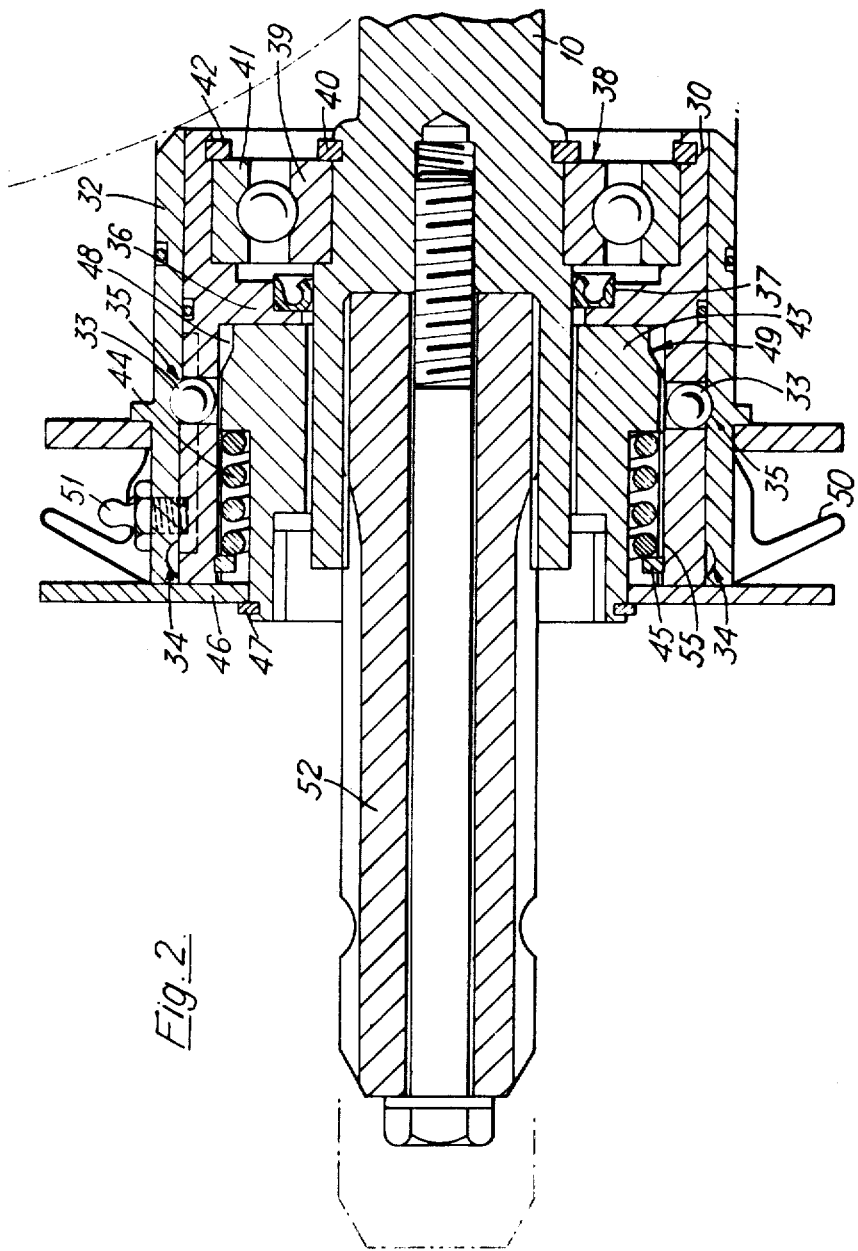
FIG. 2 is a similar view to that of FIG. 1 and showing the construction at the rear end of the p.t.o. shaft, the members being in one of said two different positions.
Figure 3:
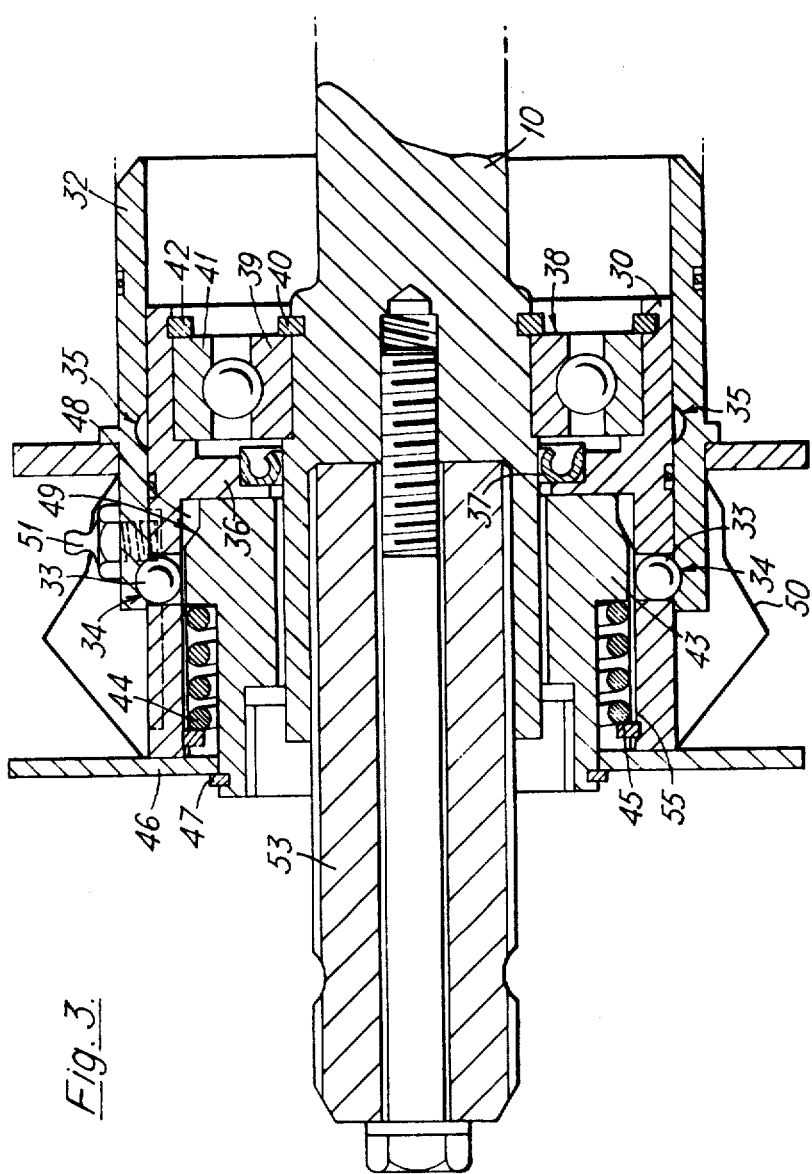
FIG. 3 is a view corresponding to FIG. 2 and showing the members in the other of said two different positions.

Referring now to FIGS. 2 and 3 of the drawings, which show the construction at the outward or rear end of the p.t.o. shaft 10, a bearing housing 30 supporting the p.t.o. shaft 10 is axially fast with the shaft and can itself occupy two positions in a tubular casing 32, these positions being illustrated in FIGS. 2 and 3 and determining, respectively, the relatively low-speed and relatively high-speed positions of the shaft. The bearing housing 30 includes in its external periphery a circumferential set of equally-spaced cages housing balls 33 which are a rolling fit in the cages, and the tubular casing 32 includes in its inner periphery surface two longitudinally spaced annular grooves 34 and 35 in each of which the balls 33 can be engaged to permit rotation of the shaft at the speed determined by whichever one of the gears 12 and 13 is engaged by the teeth or splines 11 of the shaft. When the groove 35 is engaged by the balls 33, as in FIG. 2, the gear 12 is engaged by the teeth or splines 11, and when the groove 34 is engaged by the balls 33, as in FIG. 3, the gear 13 is engaged by the teeth or splines 11. The bearing housing 30 has annular recesses opening, respectively, in the forward and rearward directions and separated by a radial wall 36 which defines the bottom of each of the recesses and at whose inner periphery is a ledge locating a C-section sealing ring 37 bearing on the shaft 10. The forwardly-opening recess accommodates an annular ball bearing 38 whose inner race 39 is locked on the shaft by abutment at one end of a shoulder on the shaft, and by a spring clip 40 engaged on the shaft and abutting the other end of the inner race. The outer race 41 of the bearing 38 is locked to the bearing housing 30 by abutment at one end against an annular shoulder at the angle between the part 30 and the wall of the forwardly opening recess, and by a spring clip 42 engaged in said wall. The annular ball bearing 38 thus prevents axial movement of the bearing housing 30 relative to the shaft 31.

An annular sleeve locking member 43 encircles the shaft and penetrates into the rearwardly opening recess of the bearing housing, being urged against the wall 36 by a spring 44 located about the member 43 in an annular ledge in the rear outer periphery of the member. The rear end of the spring 44 abuts a spring clip 45 bedded in the inner periphery of the wall of the rearwardly opening recess. The annular sleeve locking member 43 is located circumferentially by a series of involute splines 55 formed on both the sleeve 43 and the housing 30. The bearing housing 30 is held circumferentially fast with the tubular casing 32 by a locating pin 56 co-operating with an axial groove cut in the outer periphery of the housing 30. A disk 46 is apertured centrally to fit over the rearwardly protruding end of the member 43 and abuts the rear end of the bearing housing 30. The disk is located on the member 43 by a spring clip 47.

The locking member 43 is formed in its forward outer periphery with a peripheral groove 48 providing a land for the balls 33 to enable the latter to be disengaged from the groove 34 or 35 when adjustment of the p.t.o. shaft is to be effected to change from engagement with one to the other of the gears 12 and 13. To enable such shaft adjustment, the disk 46 is pulled to the rear and takes with it the annular sleeve member 43 against the action of the spring 44. The balls 33 move into the groove 48 when the member 43 has been shifted by the necessary amount. The bearing block 30, and with it the shaft 10, then moves with the locking member 43 and disk 46 relative to the tubular casing 32 so that the ball cages can be aligned with the appropriate grooves 34 and 35 into which the balls are then forced by allowing the locking member 43 to be thrust by the spring 44 until the disk 46 again abuts the rear end of the bearing housing 30. On the latter movement of the member 43 the balls are forced along the ramp face 49 of the groove 48 and into the groove 34 or 35 aligned with the ball cages.

A bellows seal 50 bridged between the disk 46 and the casing 32, and a nipple 51 enables lubrication of the ball cages and races. Different shaft ends 52 and 53 are illustrated in FIGS. 2 and 3, respectively, but they take no part in the shaft adjustment and form no part of the invention.

I claim:

1. A two-speed p.t.o. shaft which is splined for driving engagement with either one of two driven gears concentric with and spaced axially of the shaft, the length of the splining being such in relation to the axial spacing of said driven gears that the splines are out of engagement with both gears in an intermediate position when the shaft is moved axially from a position wherein the splines engage either of the gears to a position wherein the splines engage the other gear, and the shaft being locked in each of said engaged positions against axial displacement relative to a fixed part by an annular series of circumferentially spaced balls between two relatively axially moveable components one of which has alternative grooves for the balls, the balls being held in engagement in either groove by a locking member which is resiliently loaded in the direction of ball captivation and is displaceable against the resilient loading to release the balls and enable relative axial movement of the components to bring the other groove to the position in which it locates the balls.

2. A p.t.o. shaft as claimed in claim 1, in which said two relatively axially moveable components are a bearing housing concentric with and axially fast with the shaft, and a tubular casing co-axial with and closely surrounding said bearing housing, the latter mounting said annular series of circumferentially spaced balls and said tubular casing including in its inner peripheral surface said alternative grooves for the balls.

3. A p.t.o. shaft as claimed in claim 2, in which said balls are located in the bearing housing in a circumferential set of equally spaced cages.

4. A p.t.o. shaft as claimed in claim 3, in which the bearing housing has an annular recess extending axial from each end thereof and separated by a radial wall which defines the bottom of each recess, one of said recesses accommodating an annular ball bearing which supports said shaft.

5. A p.t.o. shaft as claimed in claim 4, in which said locking member is located in said other recess and is in the form of an annular sleeve encircling the shaft.

6. A p.t.o. shaft as claimed in claim 5, in which said locking member is spring biased towards said radial wall.

7. A p.t.o. shaft as claimed in claim 6, in which said locking member is located circumferentially by a series of splines formed on the locking member and co-operating with complementary splines in said other recess of the bearing housing.

8. A p.t.o. shaft as claimed in claim 7, is held circumferential fast with the tubular casing by a locating pin co-operating with an axial groove in the outer periphery of the bearing housing.

9. A p.t.o. shaft as claimed in claim 8, in which a disk is provided on the locking member to facilitate manual displacement thereof against said resilient loading.

10. A p.t.o. shaft as claimed in claim 9, in which the locking member is provided with a peripheral groove which provides a land for the balls to enable the latter to be disengaged from said alternative grooves so as to allow adjustment of the shaft.

11. A p.t.o. shaft as claimed in claim 10, in which a ramp face is provided on the peripheral groove on the locking member so as to facilitate return of said balls into said alternative grooves after adjustment of the shaft.

* * * * *